(12) United States Patent
Shiraishi et al.

(10) Patent No.: US 7,100,110 B2
(45) Date of Patent: Aug. 29, 2006

(54) SYSTEM FOR FILLING IN DOCUMENTS USING AN ELECTRONIC PEN

(75) Inventors: Yoko Shiraishi, Funabashi (JP); Naoko Tazawa, Funabashi (JP); Hisashi Ikeda, Kunitachi (JP); Hiroshi Sako, Shiki (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 10/443,098

(22) Filed: May 22, 2003

(65) Prior Publication Data

US 2003/0229859 A1    Dec. 11, 2003

(30) Foreign Application Priority Data

May 24, 2002 (JP) .............................. 2002-151377

(51) Int. Cl.
G06F 17/00 (2006.01)
G06F 17/21 (2006.01)

(52) U.S. Cl. .................. 715/514; 345/179; 178/18.01; 178/19.01

(58) Field of Classification Search ................ 715/514; 345/179; 178/18.01, 19.01
See application file for complete search history.

(56) References Cited

U.S. PATENT DOCUMENTS

| | | | | |
|---|---|---|---|---|
| 5,327,342 A * | 7/1994 | Roy | ............................ | 345/467 |
| 5,436,639 A * | 7/1995 | Arai et al. | ................... | 345/156 |
| 5,459,796 A * | 10/1995 | Boyer | ........................ | 382/187 |
| 5,612,720 A * | 3/1997 | Ito et al. | ..................... | 345/179 |
| 5,659,616 A * | 8/1997 | Sudia | .......................... | 705/76 |
| 5,682,540 A * | 10/1997 | Klotz et al. | .................. | 715/505 |
| 5,737,740 A * | 4/1998 | Henderson et al. | ......... | 715/530 |
| 5,799,315 A * | 8/1998 | Rainey et al. | .............. | 707/102 |
| 6,000,946 A * | 12/1999 | Snyders et al. | ............. | 434/365 |
| 6,050,490 A * | 4/2000 | Leichner et al. | ....... | 235/462.49 |
| 6,064,751 A * | 5/2000 | Smithies et al. | ............ | 382/115 |
| 6,081,261 A * | 6/2000 | Wolff et al. | ................. | 345/179 |
| 6,151,611 A * | 11/2000 | Siegel | ......................... | 715/541 |
| 6,456,740 B1* | 9/2002 | Carini et al. | ................ | 382/187 |

(Continued)

FOREIGN PATENT DOCUMENTS

WO    0148590 A1    7/2001

(Continued)

OTHER PUBLICATIONS

Arai, Toshifumi, et al., "Paperlink: A Technique for Hyperlinking from Real Paper to Electronic Content", CHI '97, Atlanta, GA, Mar. 22-27, 1997, ACM 0-89791-802-9/97/03, pp. 327-334.*

(Continued)

*Primary Examiner*—William Bashore
*Assistant Examiner*—Robert Stevens
(74) *Attorney, Agent, or Firm*—Mattingly, Stanger, Malur & Brundidge, P.C.

(57) ABSTRACT

When a filling person fills in a document using an electronic pen, a system refers to a document information file forming a history information file and an electronic pen information file. A judging part of the system judges the presence or absence of an entry authority over the document on the basis of the pen ID of the electronic pen and the electronic pen information file. The judging part judges an entry sequence to the document on the basis of the pen ID, a document ID applied to the document, and the document information file. A judged result is transmitted from a creating part via a communication controller to the electronic pen.

4 Claims, 11 Drawing Sheets

U.S. PATENT DOCUMENTS

| | | | |
|---|---|---|---|
| 6,519,571 B1* | 2/2003 | Guheen et al. | 705/14 |
| 6,684,188 B1* | 1/2004 | Mitchell et al. | 705/3 |
| 6,789,191 B1* | 9/2004 | Lapstun et al. | 713/168 |
| 2002/0065853 A1* | 5/2002 | Takahashi et al. | 707/527 |
| 2003/0159010 A1* | 8/2003 | Bryborn et al. | 711/159 |
| 2004/0085301 A1* | 5/2004 | Furukawa et al. | 345/179 |

FOREIGN PATENT DOCUMENTS

| | | |
|---|---|---|
| WO | 0171475 A1 | 9/2001 |
| WO | 0175723 A1 | 10/2001 |
| WO | 0175779 A1 | 10/2001 |

OTHER PUBLICATIONS

Igarashi, Takeo, et al., "An Architecture for Pen-Based interaction in Electronic Whiteboards", AVI 2000, Palermo, Italy, © 2000, ACM 1-58113-252-2/00/0005, pp. 68-75.*

Heiner, Jeremy M., et al., "Linking and Messaging from Real Paper in the Paper PDA", UIST '99, Asheville, NC, © 2000, ACM 1-58113-075-9/99/11, pp. 179-186.*

Yamada, Atsushi, et al., "Reconstructing Spatial Image from Natural Language Texts", Proc. of COLING-92, Nantes, Aug. 23-28, 1992, pp. 1279-1283.*

* cited by examiner

SYSTEM FOR FILLING IN DOCUMENTS USING AN ELECTRONIC PEN

BACKGROUND OF THE INVENTION

The present invention relates to a system for filling in documents using an electronic pen, an electronic pen and electronically processing paper for use in the system.

In government and public offices, municipal offices, companies or corporations, etc., for the purpose of facilitating document management or inquiry or the like, conversion of documents such as written applications or circular documents to electronically processible forms has been advanced in these years. In this connection, a technique for immediately converting information manually filled in such document into electronic data includes, for example, an electronic pen and electronic processing paper implemented by a technique described in WO01/48590A1.

First, the electronic processing paper means a document having the format of the document printed on a paper sheet having a special dot pattern formed thereon. The dot pattern is made of dots uniquely arranged so that, when the paper sheet is divided into grids having a predetermined size and viewed, the position of a grid on the whole paper sheet can be specified. That is, the dot pattern corresponds to an allocated part of the whole dot pattern formed on a massive area. Second, the electronic pen includes a pen device capable of visually recognizing a character or the like filled in a sheet of paper by fixing ink onto the paper sheet, a camera for reading out a dot pattern on the paper sheet, a piezoelectric element for detecting a pressure applied to the pen device, an image processing device for generating positional information of coordinate data about the locus of a character, etc., a memory for temporarily storing the positional information therein, and a wireless transmission device for transmitting the positional information to another device.

When a user fills in a document as an electronic processing paper with necessary matters using the electronic pen device, each time the piezoelectric element detects the pen pressure, the electronic pen device generates information on a position at the tip of the pen device on the basis of dots read out by the camera. The generated positional information is stored in the memory and, after the user finishes document filling, the stored positional information is transmitted from the wireless transmission device. The transmitted data is processed and subjected to character recognition as necessary in an analysis processing device for linking the positional information to the format of the document, thereby converting the data into an electronic document.

However, when the document is required to be sequentially filled in by a plurality of users, it is impossible to confirm specific one of the users who filled in a specific column. It is also difficult to confirm the filling or entry sequence of the plurality of users. To avoid this, it is considered to attach an explanation paper instructing the users about their filling or entry authority and entry sequence to the document. However, this is not preferable because it involves an increased number of documents.

SUMMARY OF THE INVENTION

It is an object of the present invention, when a user or users create a document using an electronic pen, to enable the users to confirm the presence or absence of their filling or entry authority and also to confirm the filling or entry sequence.

In accordance with the present invention, the above object is attained by providing a system for filling in a document using such an electronic pen and an electronic processing paper as mentioned above, which is arranged so that a history information file for linking the document to its filling user is utilized to judge the presence or absence of its entry authority or the right or wrong filling sequence for the filling user, whereby its judged result is informed to the filling user. In this case, it is desirable that the electronic pen be arranged to inform the filling user of the judged result in the form of appealing to user's senses of sight or hearing. Further, a check column for confirming the filling authority or sequence of the filling user may be provided in a document used in such a document filling system. Furthermore, when a definition paper for creating the above file using the electronic pen itself is employed, the utilization of the document filling system can be promoted.

Other objects, features and advantages of the invention will become apparent from the following description of the embodiments of the invention taken in conjunction with the accompanying drawings.

DETAILED DESCRIPTION OF THE EMBODIMENTS

Figure 1:
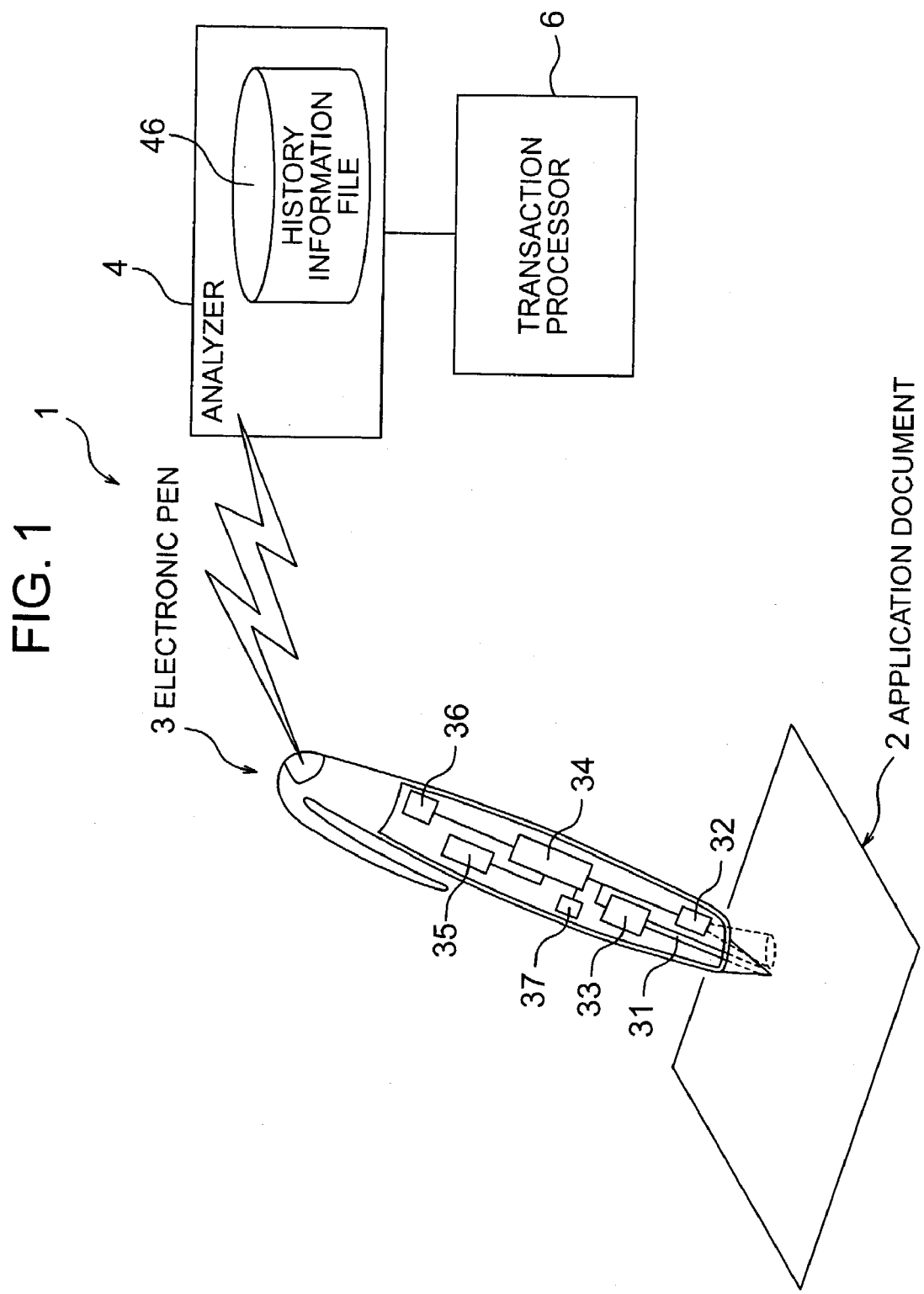
FIG. 1 shows a general configuration of a document filling system in accordance with an embodiment of the positional information.
Figure 2:
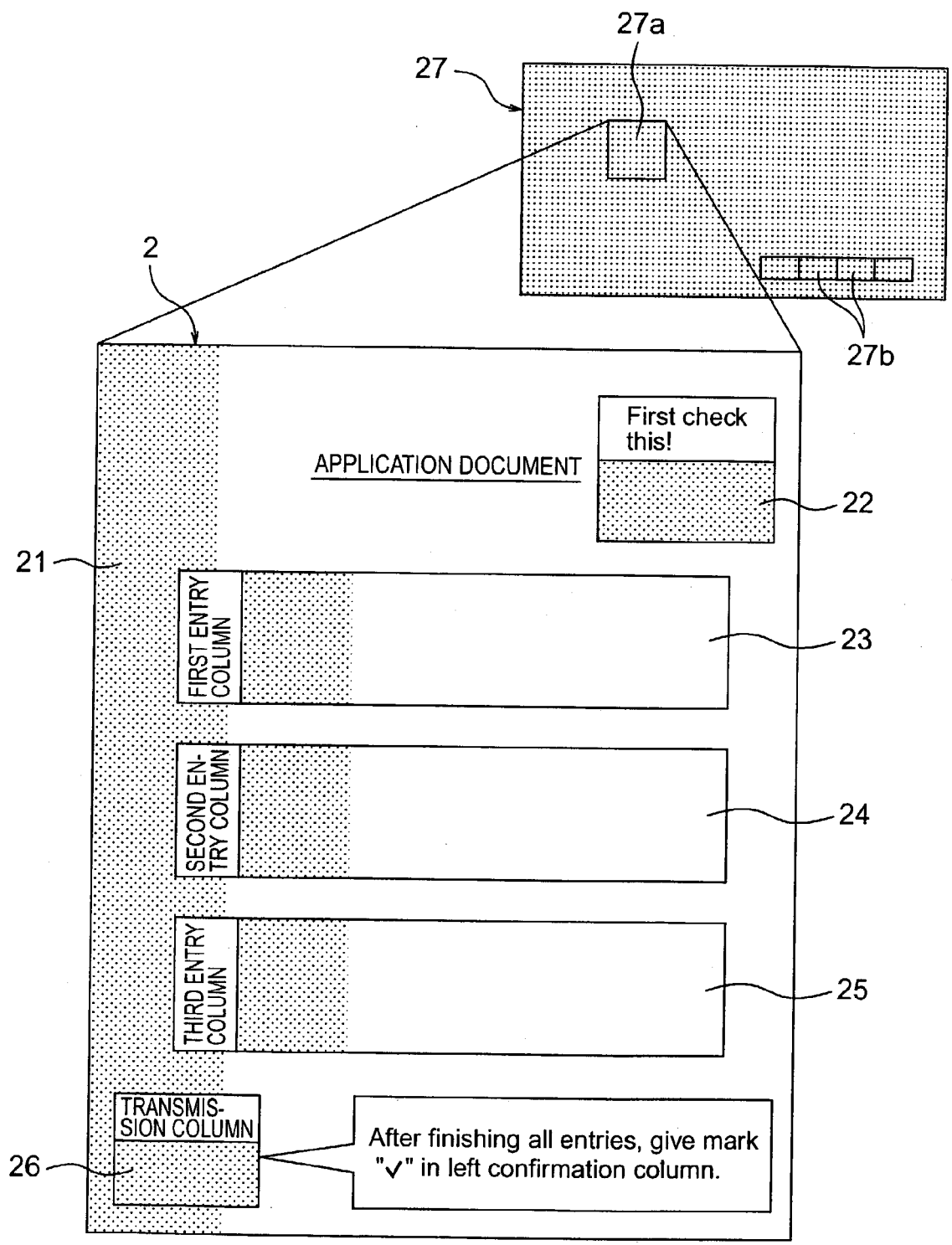
FIG. 2 shows an example of a structure of a document.

Embodiments of the present invention will be explained in detail with reference to the accompanying drawings. FIG. 1 shows a general configuration of a document filling system using an electronic pen in accordance with an embodiment. FIG. 2 shows an example of a structure of a document used in the document filling system.

As shown in FIG. 1, a document filling system 1 includes an application document 2 functioning as an electronic processing paper having a unique dot pattern printed thereon, an electronic pen 3 for filling a necessary item in the application document 2, an analyzer 4 as an analysis device for analyzing positional information created by the electronic pen 3, a history information file 46 in which a filling sequence and so on are previously defined, and a transaction processor 6 for performing transactions utilizing its analyzed result. The analyzer 4 and transaction processor 6 may be provided within a single computer terminal apparatus, or the analyzer 4 and transaction processor 6 may be provided within two computer terminal apparatuses respectively. When the analyzer and transaction processor are separately provided within the two computer terminal apparatuses, the two apparatuses are arranged so as to transmit or receive data via a communication network such as LAN (Local Area Network).

The application document 2, as shown in FIG. 2 in detail, includes a dot pattern (only part of which is illustrated) 21 on the paper sheet, first, second and third entry columns 23, 24 and 25 for necessary information to be filled in the application document 2, and a transmission column 26 as a transmission enable box to transmit positional information stored in the electronic pen 3 and indicative of the locus of the tip of the pen to the analyzer 4. The dot pattern 21 printed on the paper sheet corresponds to a part of a whole dot pattern 27 of a large number of arranged dots, which is allocated to the application document 2 as a partial area 27a. Further, a dot pattern printed on a document ID box 22 may correspond to part of the dot pattern 21 allocated to the application document 2, or a dot pattern of another area 27b may be allocated to the document ID box 22. An area, which is specially defined so that the type of the document can be judged within the electronic pen 3, is enumerated as the other area 27b.

The electronic pen 3 in FIG. 1 includes a pen 31 as a writing means for filling in the application document 2 with necessary matters, a camera 32 for reading out a dot pattern printed on the application document 2, a piezoelectric element 33 for detecting a pressure applied to the pen 31 when the user fills in the document, a processor 34 for processing data received from the camera 32 and piezoelectric element 33 to create positional information of coordinate data indicative of the locus of a character or the like, a memory 35 for temporarily storing the positional information therein, a wireless transmission device 36 for transmitting the positional information to another device or the like, and notification means 37 for feeding back the judged result in the write or filling mode to inform the user of the judged result. As an example of the wireless transmission device 36, a device for transmitting and receiving data on an electromagnetic wave signal having a frequency lying in a predetermined frequency band according to Bluetooth (registered trademark) based on one standard of short-distance wireless transmission technology as a communication protocol is enumerated. However, another device for transmitting and receiving data according to a communication protocol based on another wireless technique, wireless LAN or wired communication technique can also be employed. Stored in the processor 34 is a pen ID as unique identification information allocated to each electronic pen 3.

The notification means 37 is a vibration element which informs the user, who has no entry authority over the application document 2 or has the authority but filled in a wrong entry column, of the fact by vibrating the electronic pen 3. In this connection, the notification means 37 can be any means including a light emitting element for visually informing the user of the fact by means of light turning ON or flashing or by means of a sound source for informing the user of the fact by generating a sound, so long as it can inform the user of the judged result. Since the electronic pen 3 has such a notification means 37, the pen can quickly cope with such an entry error.

The processor 34 is made of a CPU (Central Processing Unit), a ROM (Read Only Memory), an electric or electronic circuit and so on. The functions of the processor 34 include the management and transmission of the above positional information and the operation of the wireless transmission device 36. The management of the positional information means to accept information from the piezoelectric element 33 and camera 32, to create positional information, and also to write the information in the memory 35 or to read out information therefrom. The transmission of the positional information means to transmit the pen ID, document ID and positional information to the analyzer 4 under control of the wireless transmission device 36 when the document ID box 22 or transmission column 26 is checked. The operation of the notification means 37 means, when the analyzer 4 judges, on the basis of the pen ID and positional information, that the filling was done by an unauthorized person or the filling was done in a wrong column, to operate the notification means 37 when the electronic pen 3 receives information indicative of the fact (which will be referred to as the disable information, hereinafter) because the electronic pen 3 receives the information from the analyzer 4.

Figure 3:
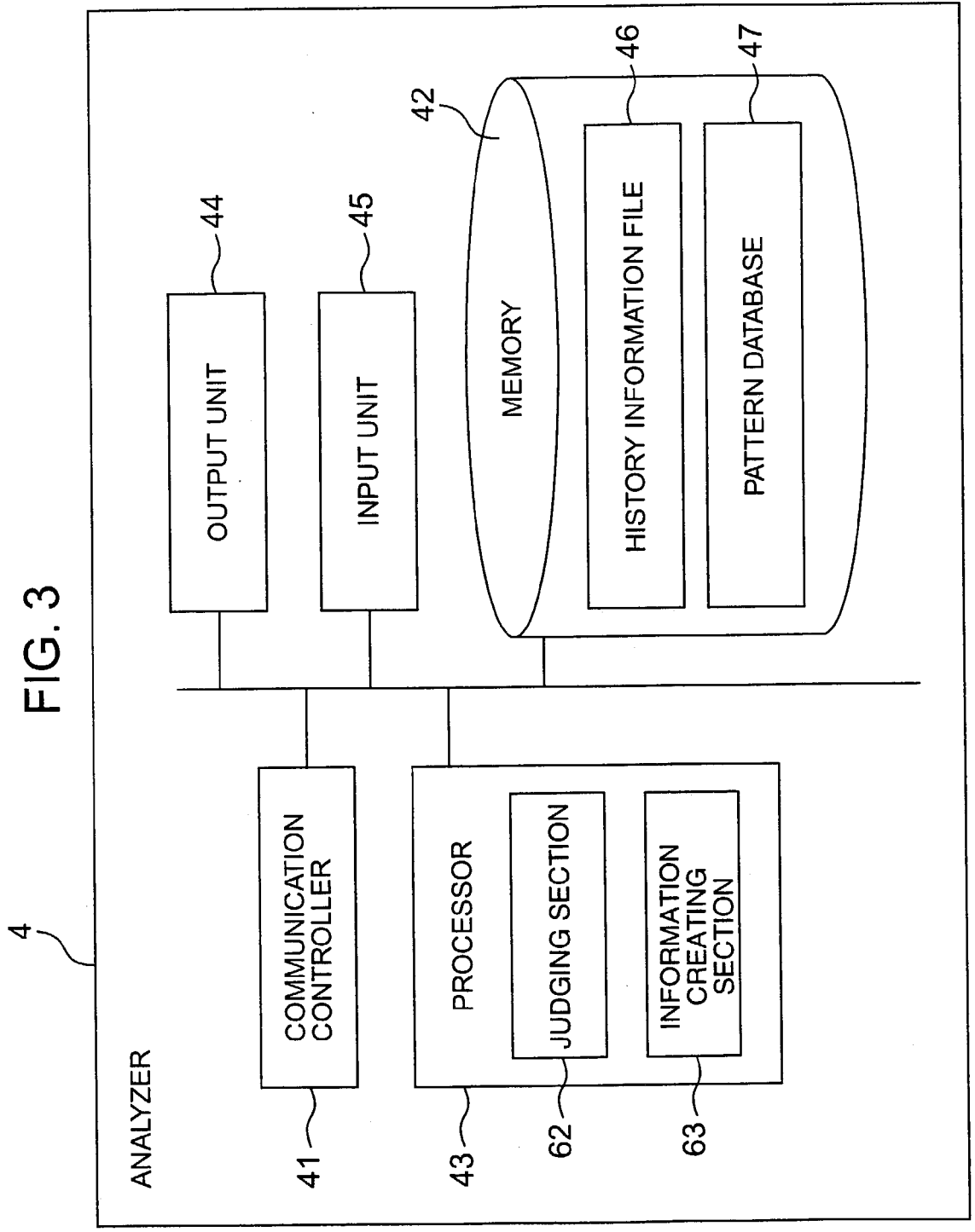
FIG. 3 is a block diagram of a structure of an analyzer.

The analyzer 4, the detailed structure of which is shown in FIG. 3, has at least a communication controller 41 as a communication means for receiving information from the electronic pen 3, a memory 42 in which various sorts of files or the like are formed, and a processor 43 for performing data processing operation. In this connection, the analyzer may include an output unit 44 such as a display or an input unit 45 such as a keyboard or mouse. The communication controller 41 performs direct data transfer to and from the electronic pen 3. A relay device may be provided between the communication controller and the electronic pen 3 so as to be connected to the analyzer 4 via a wired communication network. In this case, in place of the communication controller 41 based on the aforementioned wireless transmission technique, a communication control for transmitting and receiving data according to a protocol conforming to the communication network is employed.

The memory 42, which includes a hard disk drive or the like, can store a program to be developed or initiated in the processor 43 or other data therein. Files to be formed in the memory 42 include, for example, a history information file 46 in which the filling electronic pen 3 and the entry sequence are defined and a pattern database 47 for linking positional information to a document.

Figure 4:
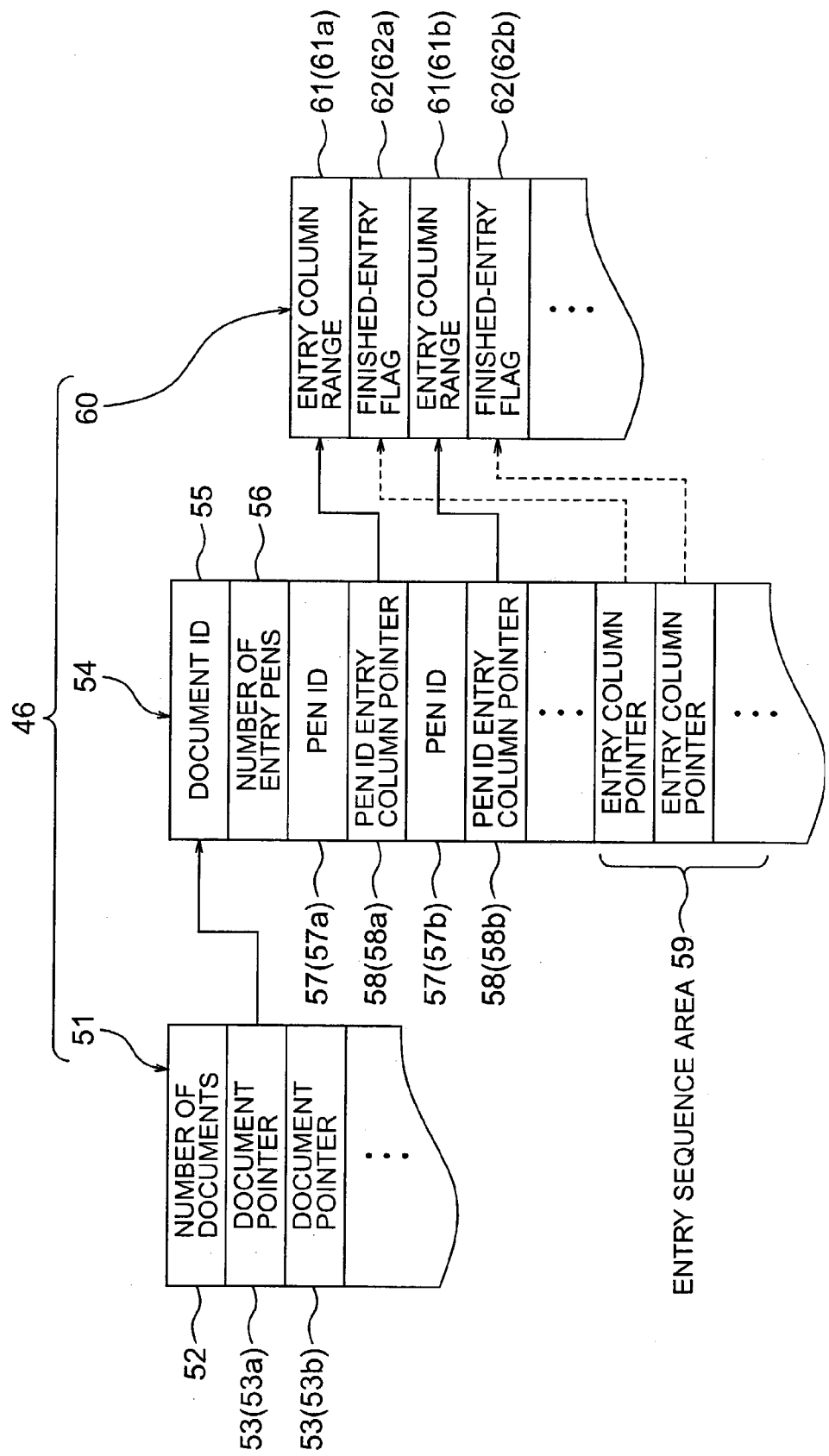
FIG. 4 shows a structure of a history information file.

The history information file 46 is prepared for linking the application document 2 to the electronic pen 3, and has such a hierarchy or layered structure as shown in FIG. 4. A first layer 51 has the number 52 of stored documents including the application document 2 (which will be referred merely as the document number, hereinafter), and a document pointer 53 (including a document 1 pointer 53a, a document 2 pointer 53b, . . . ) in which leading addresses of a group of pieces of data for detailed definition on the memory of the documents are stored. The document pointers are created by a number defined in the document number 52.

A second layer 54 has a document ID 55 initiated by an address stored in the document pointer 53 and the defined number 56 of entry pens (which will be referred merely as the entry pen number, hereinafter), followed by pieces of information arranged sequentially according to the entry sequence for defining correlations between the electronic pens 3 and the entry columns 23 to 25 by a number corresponding to the number of electronic pens 3 defined in the entry pen number 56 or for setting the entry sequence. Such information include a pen ID 57 (including a pen ID 57a, a pen ID 57b, . . . ) of the electronic pen 3, a pen ID entry column pointer 58 (including a pen ID entry column pointer 58a, a pen ID entry column pointer 58b, . . . ) in which a leading address on the memory is stored to store information of the pen ID entry column for entry by the electronic pen 3 defined in the pen ID 57, and an entry sequence area 59 for defining the entry sequence. The pen ID entry column pointers 58 are arranged as associated with the pen ID's 57.

A third layer 60 includes an entry column range 61 (such as an entry column range 61a and an entry column range 61b) started with an address stored in a pen ID entry column pointer 52d for defining areas of the entry columns 23 to 25 of the granted entry in the form of coordinates, and a finished-entry flag 62 (such as a finished-entry flag 62a and a finished-entry flag 62b) for setting a flag when the entry to the entry range is finished. When a plurality of entry columns are provided, data about a plurality of areas are stored in the entry column range 61. The finished-entry flags 62 are arranged as associated with the entry column ranges 61.

Registered in the pattern database 47 shown in FIG. 3 are a dot pattern and the columns 22 to 26 of the application document 2 shown in FIG. 2 as associated with each other. In other words, in order to start the processing of the application document 2 in the form of electronic data, it becomes necessary to allocate part of the dot pattern registered in the pattern database 47 to the application document and to register format information about the application document 2 in the pattern database 47.

The processor 43, which includes a CPU, a RAM (random access memory) and a ROM, functions to generally control the operation of the analyzer 4. The functions of the processor 43 specific to the present embodiment includes the reception of positional information including the pen ID, the transmission of the disable information, and the transmission of data to a transaction processing application program. In addition to the above, the processor 43 includes a means 62 for judging matching between the electronic pen 3 and the entry columns 22 to 26 or judging matching of the entry sequence and a means 63 for creating image data conforming to the format of the application document 2 on the basis of the positional information and pattern database 47 and creating the above disable information.

The reception of the transmitted positional information having the pen ID attached thereto is carried out by controlling the communication controller 41. The judgment concerning the electronic pen 3 and entry columns 22 to 26 is made by acquiring predetermined information from the history information file 46. The transmission of the disable information to the electronic pen 3 is carried out when the contents of the information acquired from the electronic pen 3 is different from the contents defined in the history information file 46 as the judged result to send the fact to the electronic pen 3, and this is realized by controlling the communication controller 41. The creation of image data is carried out by processing the positional information on a time-series basis to reproduce a filled character or the like as an image and by giving an image filling position to the data of the image in the format of the application document 2 registered in the pattern database 47. In this connection, it is also possible to convert the image data to text data by a known character recognition technique. In this case, it becomes necessary to provide a means for converting the image data to text data. In this case, further, a database for character recognition having the text information registered therein is stored in the memory 42. The data transmission to the transaction processor 6 is carried out under control of the communication controller 41.

The transaction processor 6 is a terminal apparatus which actually processes an application document using a predetermined application program, and which is usually a known computer having a communication controller, a memory, a processor and a display, though not shown. Exemplary one of the transactions as given here is to handle text data obtained by applying character recognizing operation or the like to a work flow utilizing an image through image data creation or to image data. Since the arrangement and operation of the transaction processor are known except that the application document 2 is acquired as electronic data and processed, its detailed explanation is omitted.

Explanation will next be made as to the operation of the document filling system 1 using the electronic pen 3, by referring to mainly a flowchart of FIG. 5. The following explanation will be made in connection with an example where three electronic pens 3 are used to create an application document 2.

In Step S1, the system extracts positional information on the document ID box 22 shown in FIG. 2. The extracting operation is carried out by a user who fills in the document ID box 22 with a check mark using the first electronic pen 3, so that the processor 34 (refer to FIG. 1) creates positional information about the tip of the pen based on the dot pattern and transmits the information to the analyzer 4.

In Step S2, the system specifies a document, that is, the application document 2 in this example. On the basis of information about the document ID included in the found positional information, the system searches for the history information file 46 and specifies the document. The document ID can be determined based on the correlation between position coordinate information and the document ID previously registered. More specifically, the system can specify the address of the document ID 55 containing the same document ID as the acquired document ID, from a group of pieces of data in the second layer 54 of the history information file 46 shown in FIG. 4 as its layered structure.

In Step S3, the system judges the presence or absence of the entry authority of the first electronic pen 3 over the application document 2. The judging operation is carried out paying attention to the pen ID 57 in the data of the document number 52 specified by the document ID. That is, the judging means 62 compares the value of the pen ID transmitted from the electronic pen 3 with the value stored in the pen ID 57. When the value of the transmitted pen ID coincides with the value of the pen ID 57 as a compared result, the system determines that such an electronic pen 3 has an entry authority (is authorized) over the application document 2 and proceeds to Step S6. When the value of the pen ID does not coincide with the value of the pen ID 57, on the other hand, the system determines the electronic pen 3 has no entry authority (is not authorized) over the application document 2, and goes from a terminal A to Steps S4 and S5.

In Step S4, as when the electronic pen 3 has no entry authority, the system transmits disable information from the communication controller 41 to the electronic pen 3. The disable information, which is an instruction for operating the notification means 37 built in the electronic pen 3, is created by specifying the pen ID and by the disable-information creating means 63 (refer to FIG. 3). In the subsequent Step S5, the electronic pen 3 when receiving the disable information informs the user of the fact that the user has no authority through the notification means 37. The disable information is transferred from the wireless transmission device 36 of the electronic pen 3 to the processor 34, which in turn outputs a signal to the notification means 37 to operate the notification means. The notification means 37, when receiving the signal, informs the user of the fact, for example, by vibrating the electronic pen 3 itself. In this case, the vibration refers to the check judgment result for the document ID box 22. Thus the vibration of the electronic pen 3 enables the person using the electronic pen 3 to quickly recognize or know that the user per se has no entry authority over the application document 2.

In Step S6, the system judges the entry sequence of the electronic pen 3. The judging operation is started by referring to the entry sequence area 59 of the second layer 54 of the history information file 46, by checking judging means finished-entry flags 62 conformable from the entry column pointer stored in the entry sequence area and by detecting the last finished-entry flag 62. And when the system detects the last finished-entry flag 62, the system acquires the pen ID 57 of the electronic pen 3 used when the last finished-entry flag 62 was set. The system compares the pen ID 57 with the pen ID of the electronic pen 3 actually being used, and when the system finds a coincidence therebetween, the judging means 62 (see FIG. 3) determines that the entry sequence is "correct", after which the system proceeds to Step S7. When the system fails to find a coincidence therebetween, on the other hand, the system determines that the entry sequence is "wrong" and goes to Step S4. In this manner, the system can detect a currently usable pen ID (the pen ID next to the last-listed pen ID) and can judge the entry sequence by comparing the detected ID with the ID of the pen being actually used. It is assumed that, in this example, since the filling is made by the first electronic pen 3 and the finished-entry flag 62 is not set yet, the system acquires the first pen ID 57a and compares the pen ID 57a with the pen ID acquired from the first electronic pen 3.

Step S7 is executed when the system determines in Step S3 that the user has the entry authority, wherein the electronic pen 3 creates positional information about the other entry columns 23 to 26. For example, when the pen ID value of the electronic pen 3 coincides with the value stored in the pen ID 57a in the above operation, necessary matters such as a check mark, character and a line drawing are sequentially entered in the entry columns 23 to 26. Therefore, the electronic pen 3 generates positional information based on the dot pattern on the paper sheet. The positional information is stored in the memory 35 of the electronic pen 3 until the transmission column 26 is checked.

In Step S8, the analyzer 4 stores the positional information. As mentioned above, the positional information is stored in the memory 35 of the electronic pen 3 until the transmission column 26 is checked. As soon as the transmission column 26 is checked, the positional information is transmitted from the wireless transmission device 36 of the electronic pen 3 to the analyzer 4. The processor 43 in the analyzer 4 shown in FIG. 3 acquires the positional information received under control of the communication controller 41, and stores it in the memory 42 or the like for later processing. It is desirable that the stored positional information be associated with the format of the application document 2 and be divided as associated with the respective entry columns 22 to 26.

Step S9 is carried out to judge the entry position. This judging operation is carried out, paying attention to the data of the third layer 60 specified by the document ID 55 and pen ID 57 in the history information file 46 of FIG. 4. For example, when electronic pen is specified by the pen ID 57 in the above operation, the judging means 62 examines the entry column range 61a of an address shown by the pen ID entry column pointer 58a arranged as associated with the pen ID 57a. And when the judging means determines that coordinates (which will be referred to as the entry area, hereinafter) indicated by the positional information are included in an area (which will be referred to as the definition area, hereinafter) defined by the entry column range 61a of the third layer 60, the judging means determines that the entry position is 'correct' and control goes to Step S10. When the definition area is not included in the entry area, on the other hand, the judging means determines that the entry position is 'wrong' and control proceeds from the terminal A to Steps S4 and S5 to inform the user of the fact that the electronic pen 3 is improper. When there are a plurality of entry locations, the operation of Step S9 is carried out for all the entry locations.

The operation of Step S10 is for judging whether or not the entry sequence by the electronic pen 3 is right. This operation is carried out based on the entry sequence area 59 of the second layer 54 in the history information file 46 of FIG. 4. The judging means 62 judges whether or not a sequence entered by the electronic pen 3 coincides with the array sequence of the entry column in the entry sequence area 59. When finding a coincidence between the both sequences, the judging means determines that the entry sequence is 'correct' and control goes to Step S11. While when failing to find a coincidence between the sequences, the judging means determines that the entry sequence is 'wrong' and control proceeds to Steps S4 and S5 to inform the user of the presence of an impropriety. In this case, since this is the first entry by the first electronic pen 3, the judging means judges that the entry sequence is right and control goes to Step S11.

The operations relating to the first electronic pen 3 have now been completed. The system sets the finished-entry flag 62a for the first electronic pen 3 in Step S11, and thereafter transfers positional information created by the entry of the first electronic pen 3 to an application program of the transaction processor 6 in Step S12, completing its operation. In this connection, the setting of the finished-entry flag means to substitute a value for the finished-entry flag 62 to set a flag.

Subsequently, the system performs the entry works by the second electronic pen 3 and the operations involved thereby.

The user, who accepted the application document 2 which was partly filled in using the first electronic pen 3, fills in the application document using the second electronic pen 3. The filling is carried out for at least one of the document ID box 22 and entry columns 23 to 25 in the order of the transmission column 26.

At this time, since the electronic pen 3 creates positional information based on the document ID box 22 (Step S1), the analyzer 4 performs document specifying operation (Step S2) and entry authority judging operation (Step S3).

When the analyzer judges that the second electronic pen 3 has an entry authority, the analyzer refers to the finished-entry flag 61 and judges the entry sequence between the electronic pens 3 (Step S6). When the analyzer judges that the entry sequence is also correct, positional information about the other entry columns 22–26 are created by the electronic pen 3 (Step S7), and the analyzer 4 acquires and stores the positional information (Step S8). And the judgment of the entry position (Step S9) is carried out. In this case, the judgment of the entry position, when the value of the pen ID of the second electronic pen 3 is a value stored in the pen ID 57b for example, is carried out based on the entry column range 61b specified via the pen ID entry column pointer 58b.

Further, the judgment of the entry sequence (Step S10) is carried out. In the judgment of the entry sequence in this example, the judging means 62 confirms the finished-entry flag 62a of the first electronic pen 3 from entry column pointers arranged in the entry sequence in the entry sequence area 59 defined in the second layer 54 of the history information file 46. When the finished-entry flag 62a of the first electronic pen 3 is not set, that is, when the column is regarded as not filled in by a due person who is to be done previously, the system proceeds to Step S4 where the disable-information creating means 63 creates and transmits disable information, and further proceeds to Step S5 to inform the user of the impossible filling. When the entry column range 61a of the first electronic pen 3 is already set, that is, when the entry by the electronic pen 3 to be filled in previously to the second electronic pen 3 is regarded as already done, on the other hand, the system proceeds to Step S11.

The operations relating to the second electronic pen 3 have now been completed. Thus the system sets the finished-entry flag 62b of the second electronic pen 3 (Step S10), and then passes the positional information to the application program of the transaction processor 6 (Step S12). In this connection, when each judged result is negative (judged as 'no authority' or 'error' in each of Steps S3, S9 and S10), the analyzer 4 transmits disable information to the second electronic pen 3 (Step S4). Thus this causes the electronic pen 3 to operate the notification means to inform the user of the fact (Step S5).

Further, when the entry works of the third electronic pen 3 and operations involved thereby are carried out, the user, who accepted the application document 2 after subjected to the entry of the first and second electronic pen 3, fills in the application document 2 in the order of at least one of the entry columns 23 to 25 and the transmission column 26. Of the operations carried by the document filling system 1 in response to the entry of the third electronic pen 3, the judging operation of the entry sequence (Step S10) includes also the judgment of the entry sequence of the third electronic pen 3. More specifically, when the confirmation of the finished-entry flag 62a of the first electronic pen 3 and the confirmation of the finished-entry flag 62b of the second electronic pen 3 are carried out and when the two finished-entry flags 62a and 62b are both set, that is, when all entries can be regarded as already filled in by the previous authorized users, the system sets a finished-entry flag of the third electronic pen 3 (Step S11) and passes the positional information to the transaction processor 6 (Step S12). Meanwhile, when at least one of the finished-entry flags 62a and 62b is not set yet, the system informs the user of the fact by transmitting the disable information to the electronic pen (Steps S4 and S5). In this connection, since the other operations are the same as those in the first and second electronic pens 3, explanation thereof is omitted.

In the present embodiment, since the application document 2 is completed using the three electronic pens 3, the operations of the analyzer 4 are all completed, after which the transaction processor 6 performs the accepting operation of the application document 2 and other operations. When a single application document 2 is created using a plurality of electronic pens 3, such a document filling system 1 can judge the entry locations by the electronic pens 3 or the entry sequence of the pens. Accordingly, the system can reduce document filling errors. And if the entry location or entry sequence was wrong or when an unauthorized person filled in the document, then the system can inform the filling person of the wrong entry authority through the electronic pen 3, whereby the system can immediately find a wrong filling.

SECOND EMBODIMENT

Explanation will be made in detail as to a second embodiment of the present invention, by referring to the accompanying drawings. In this connection, constituent elements of the second embodiment having the same functions as those of the first embodiment are denoted by the same reference numerals or symbols and explanation thereof is omitted.

Figure 6:
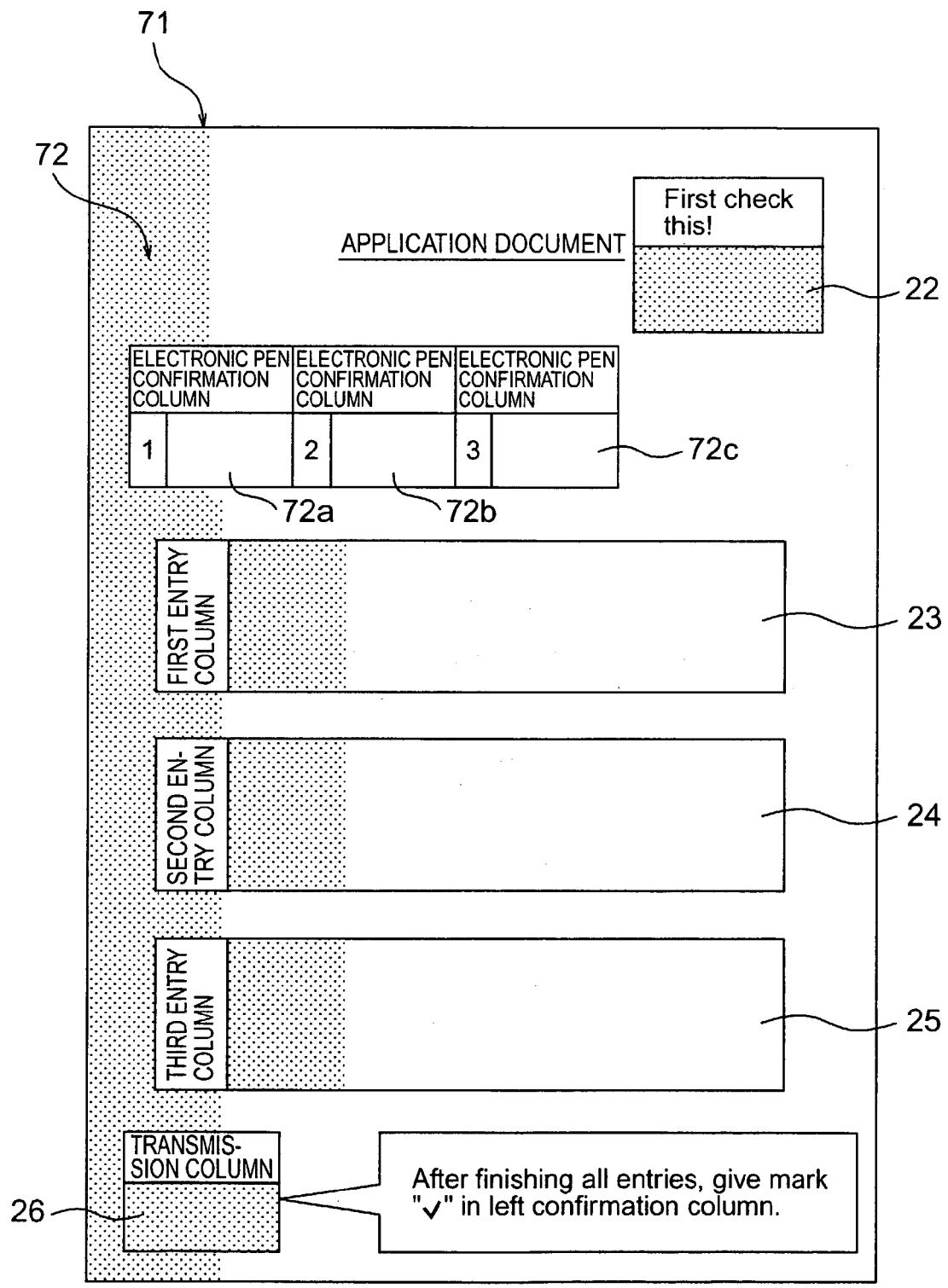
FIG. 6 shows an example of a structure of a document.

The document filling system 1 of the present embodiment is featured by use of such an application document 71 as shown in FIG. 6. The application document 2 is featured in that the application document functions as a paper to be electronically processed and that, prior to entry of the entry columns 23 to 25, an electronic pen confirmation column 72 capable of confirming the entry authority and entry sequence of the electronic pen 3 is provided. In the electronic pen confirmation column 72, check boxes 72a, 72b and 72c corresponding in number to the number of electronic pens 3 for entry of the document are arranged in the entry osequence, and '1', '2', '3' and so on are visually represented in the respective electronic pen confirmation columns 72a, 72b and 72c.

Now explanation will be made as to the operation of the document filling system 1 when the application document 71 having the electronic pen confirmation column 72 is used.

Figure 5:
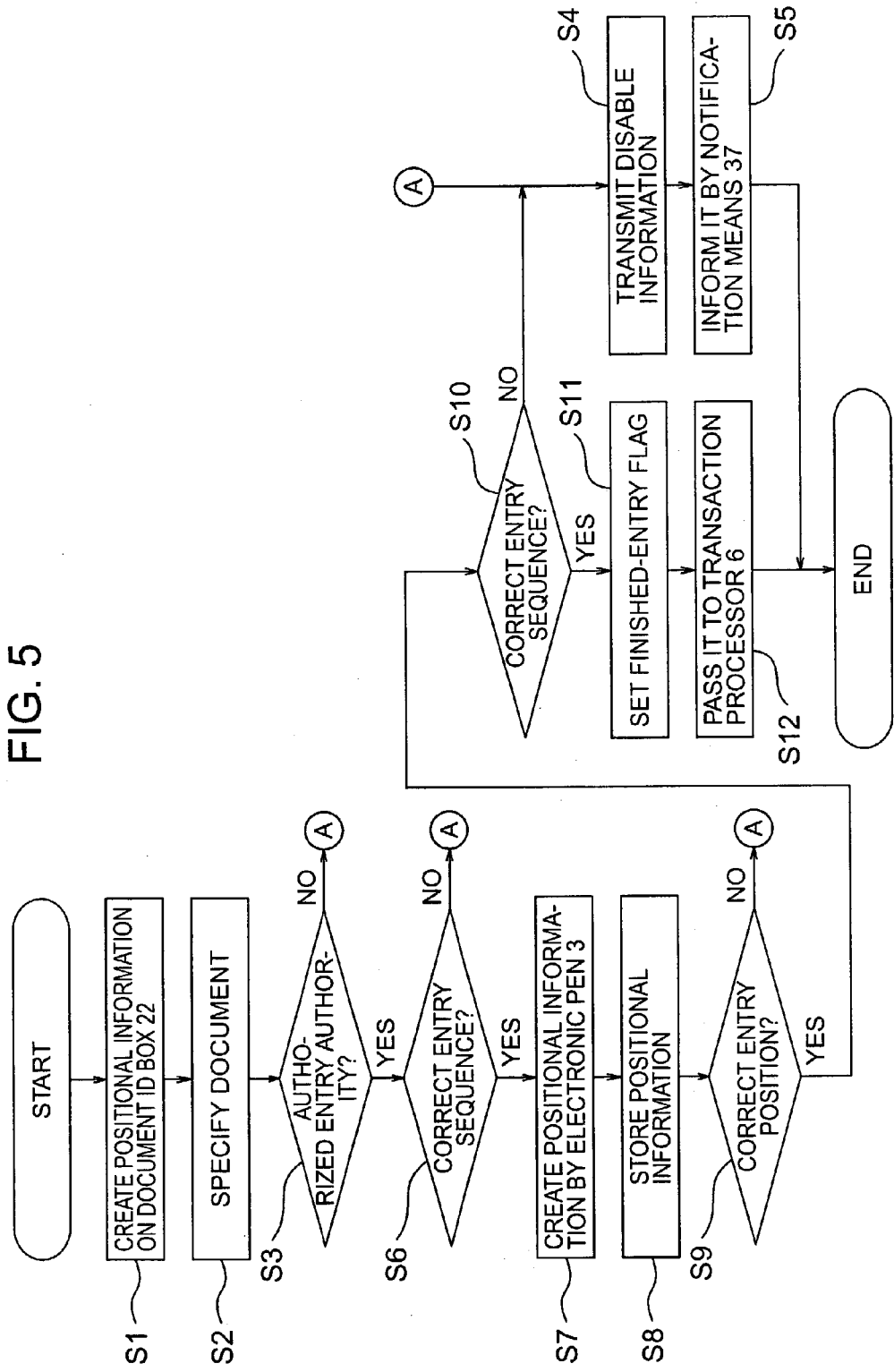
FIG. 5 is a flowchart for explaining the operation of the document filling system.
Figure 7:
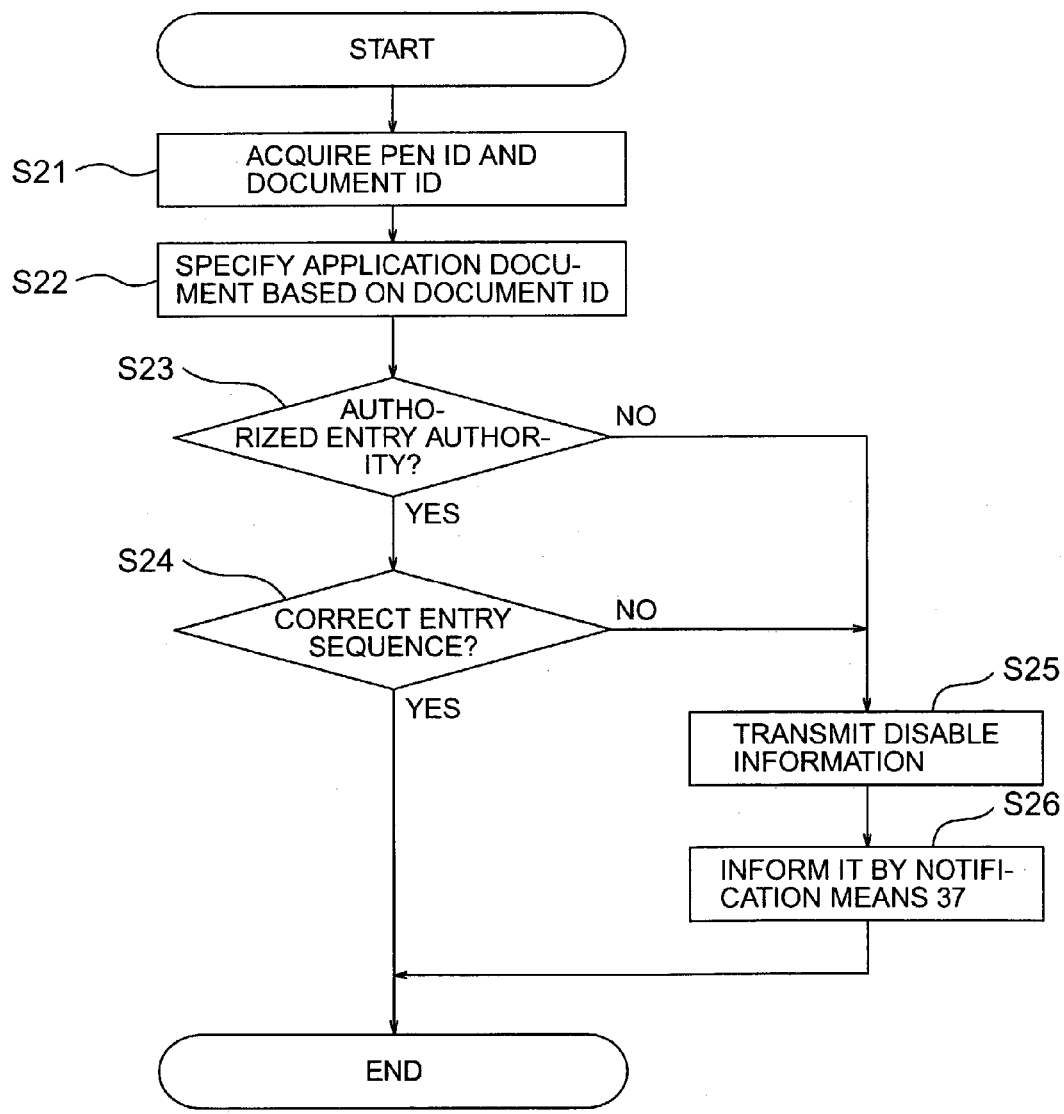
FIG. 7 is a flowchart for explaining the operation of the document filling system.

The document filling system 1, prior to operation based on the flowchart of FIG. 5, can first confirm the electronic pen 3 through the operation of a flowchart of FIG. 7. The confirming operation starts in Step S21 with acquiring a pen ID of the electronic pen 3 and a document ID of the application document 71. The pen ID is obtained as data to be attached to positional information when the user fills in the document ID box 22 or in the electronic pen confirmation column 72 with a check mark using the electronic pen 3. The pen ID, when the user fills in the electronic pen confirmation column 72 with a check mark, is transmitted to the analyzer 4.

In Step S22, the system specifies the document, i.e., the application document 2 on the basis of the document ID. The specifying operation of the application document 2 is carried out by searching the history information file 46 (refer to FIG. 4) for the acquired document ID.

In Step S23, the system judges at the judging means 62 whether or not the electronic pen 3 has an entry authority over the application document 71. When the pen ID of the electronic pen 3 is present in the value stored in the pen ID 57 arranged as associated with the document ID 54 in the history information file 46, the system determines that the electronic pen 3 is 'authorized' and proceeds to Step S24. When the pen ID is not present in the value of the pen ID 57, on the other hand, the system judges that the electronic pen 3 is 'not authorized or unauthorized' and proceeds to Step S25. In Step S25, the analyzer 4 transmits disable information to the electronic pen 3. In subsequent Step S26, the electronic pen 3 operates the notification means 37 to inform the user of having no filling authority.

In Step S24, the system judges the entry sequence of the electronic pen 3. The judging operation of the entry range is carried out by referring to the entry sequence area 59 of the second layer 54 of the history information file 46 specified by the acquired document ID. For example, if the electronic pen 3 is to be used for the second-time entry, then the system examines the finished-entry flag 62a of the electronic pen 3 for use in the first-time entry. When the system can confirm that the finished-entry flag 62a is set, the judging means 62 determines that the entry sequence is 'correct'. In the case of the electronic pen 3 for use in the third-time entry, when system can confirm that the 62a of the first electronic pen 3 and the finished-entry flag 62b of the second electronic pen 3 are both set, the judging means determines that the entry sequence is 'correct'. Meanwhile, when the system confirms the setting of the judging means 62 and determines that the entry sequence is 'wrong', the system proceeds to Steps S25 and S26 to inform the user of the wrong entry sequence.

And if the system judges that the entry sequence is 'correct', then the system terminates its operation.

Through such a processing flow, the system can confirm, before the user fills in the entry columns 23 to 25 of the application document 71 with specific matters, that the electronic pen 3 has its entry authority and that the entry sequence of the application document 71 is correct. Since such confirmation is done, filling errors for the application document 71 can be remarkably reduced. Further, when such character or figure such as the name of the filling person capable of specifying the person is given in the check boxes 72a, 72b and 72c of the electronic pen confirmation column 72, another person can visually confirm the person who already filled therein, whereby entry works can be smoothly advanced.

In this connection, since operations to be carried out when necessary matters are entered in the entry columns 23 to 25 of the application document 71 are substantially the same as those explained in the first embodiment in connection with FIG. 6, explanation thereof is omitted. In this case, the operations (from Step S1 to Step S3) until the authorized electronic pen 3 is judged as well as the judging operation (Step S10) of the entry sequence can also be omitted. Further, when the document ID box 22 is filled in with a check mark, the pen ID is also transmitted. Thus the system also can judge the entry sequence with the document ID box 22 alone without providing the electronic pen confirmation column 72. In this case, a plurality of check marks or the like are overwritten in the document ID box 22. Although it becomes difficult for another user to visually confirm the person who already filled in when compared with the case of the presence of the electronic pen confirmation column 72, the system can judge the entry sequence.

THIRD EMBODIMENT

A third embodiment of the present invention will be detailed with reference to the accompanying drawings. In this connection, constituent elements having the same functions as those in the first and second embodiments are denoted by the same reference numerals-or symbols, and detailed explanation thereof is omitted.

The present embodiment is directed to an arrangement for simply creating the history information file 46 and operations involved thereby. In this example, the creation of the history information file 46 is assumed to also include the attachment of new information to the history information file 46 already created.

The creation of the history information file 46 is carried out by a file creation application program which enters necessary data in the analyzer 4 shown in FIG. 3 and develops and activates the data in the processor 43. The file creation application program is made up of a means for identifying the type of the data such as document ID or pen ID and a means for storing the identified data in the memory and forming the history information file 46 having a layered structure.

A means and method for entering data to be used to create the history information file 46 will be explained in the following.

Figure 8:
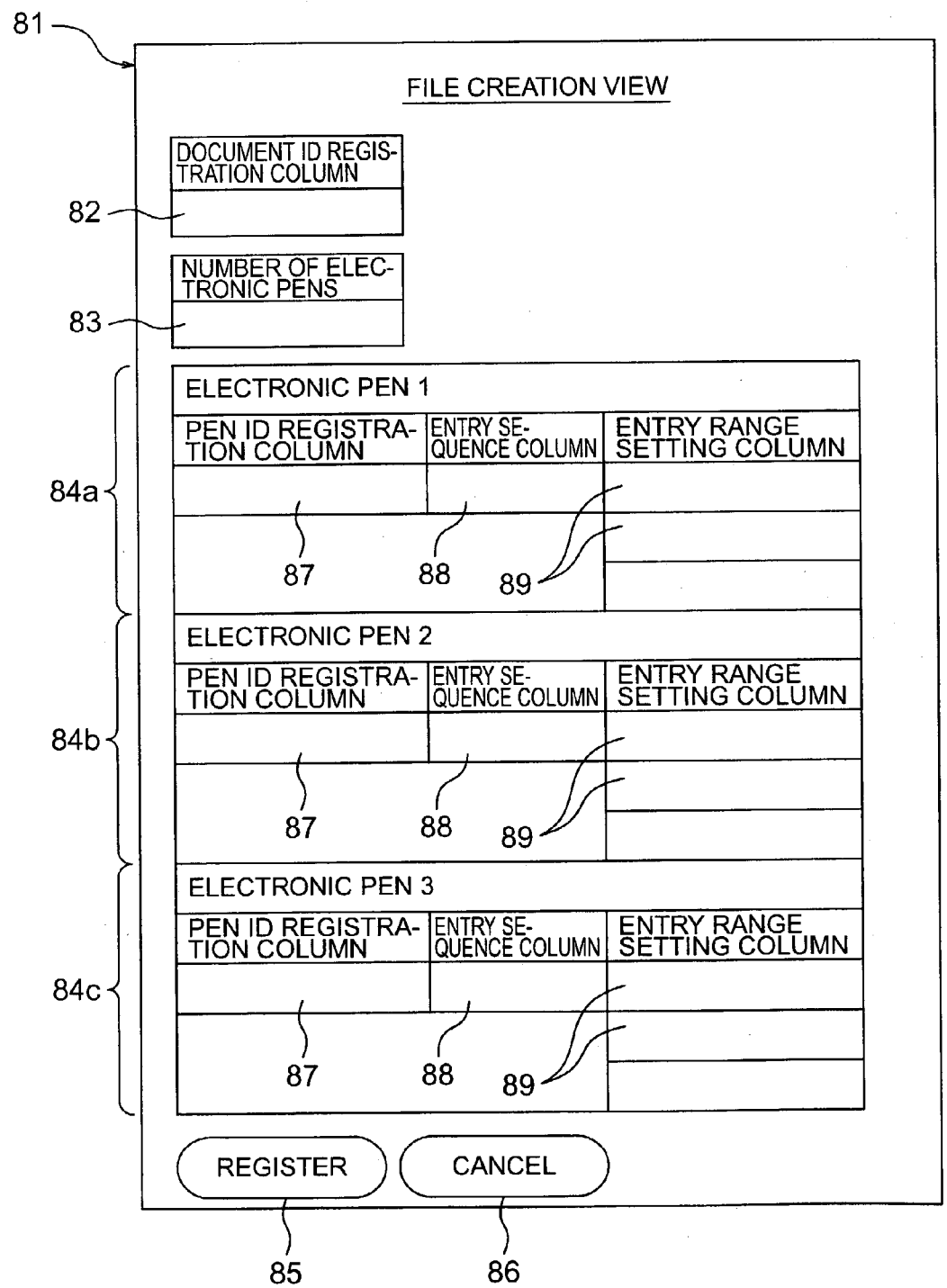
FIG. 8 shows a view on a display screen used to create the history information file.

First, FIG. 8 shows an example of a view on a display screen for acquisition of data for the history information file 46. A file creation view 81 includes a document ID registration column 82 for entering the document ID of a document for creating the history information file 46, an electronic pen number column 83 for registering the number of electronic pens 3 to be used in the document, areas 84a, 84b and 84c for entering information relating to the registered electronic pens 3, a registration button 85 for instructing to create the history information file 46 on the basis of the entered data, and Cancel button 86 the data.

Arranged in the areas 84a, 84b and 84c to be set for each of the electronic pens 3 are pen ID registration columns 87 for registering the pen ID's of the electronic pens 3, entry sequence columns 88 for managing the entry sequence among the users based on the pen ID's when a plurality of the users fill in the document using a plurality of electronic pens 3, as well as entry range setting columns 89 for registering entry columns (such as the entry columns 23 to 25 in FIG. 2) capable of being filled in using the electronic pens 3 as areas. When it is necessary to set a plurality of entry boxes, the entry range setting column 89 is arranged as a plurality of columns and the addition or deletion of the column is carried out using an Insert or Delete button. For example, when the entry range setting column 89 of the area 84a is increased by one, the areas 84b and 84c are moved downwards by a corresponding amount. On the contrary, when the entry range setting column 89 of the area 84a is decreased by one, the areas 84b and 84c are moved upwards by a corresponding amount.

In this connection, it is also possible to print the file creation view 81 on a paper sheet having a predetermined dot pattern formed thereon, enter the columns 82, 83, 87, 88 and 89 using the electronic pens 3, and convert the entered hand-written information to electronic data to create the history information file 46. In this case, in place of the Register button 85 and Cancel button 86, such a transmission column 26 as shown in FIG. 2 is provided. Further, it is desirable to provide a document ID box 22 in order that the document filling system can recognize that the document is a document for creation of the history information file 46.

It is also possible to acquire data for forming the history information file 46 using the same documents as documents to be actually filled and the electronic pen 3. In other words, when the user fills in the document ID box 22 of the application document 2 shown in FIG. 9 with a check mark using the electronic pen 3, a document ID is acquired; whereas, when check marks (shown by 'X' in FIG. 9) are given to four corners of the entry columns 23 to 25, the entry areas can be specified based on their coordinates. Further, when the checking of the entry columns 23 to 25 is carried out using the electronic pen 3 to be actually used for each entry sequence, the authority of the electronic pen 3 and setting of the entry sequence can be set. In this case, the application document 2 functions as an electronically processing paper (definition paper) for defining information to be electronically processed in the document filling system, the document ID box 22 is an entry column to be used for acquiring the document ID and pen ID, and the entry columns 23 to 25 are entry columns for acquiring entry columns and entry sequence to specify the areas to be filled by the electronic pen. When it is desired to create the history information file 46 with use of such an application document 71 as shown in FIG. 6, the document ID box 22 becomes an entry column for acquiring the document ID, the entry columns 23 to 25 become entry columns for specifying areas to be filled by the electronic pen, and the electronic pen confirmation column 72 becomes an entry column for acquiring the pen ID and the entry sequence.

Figure 9:
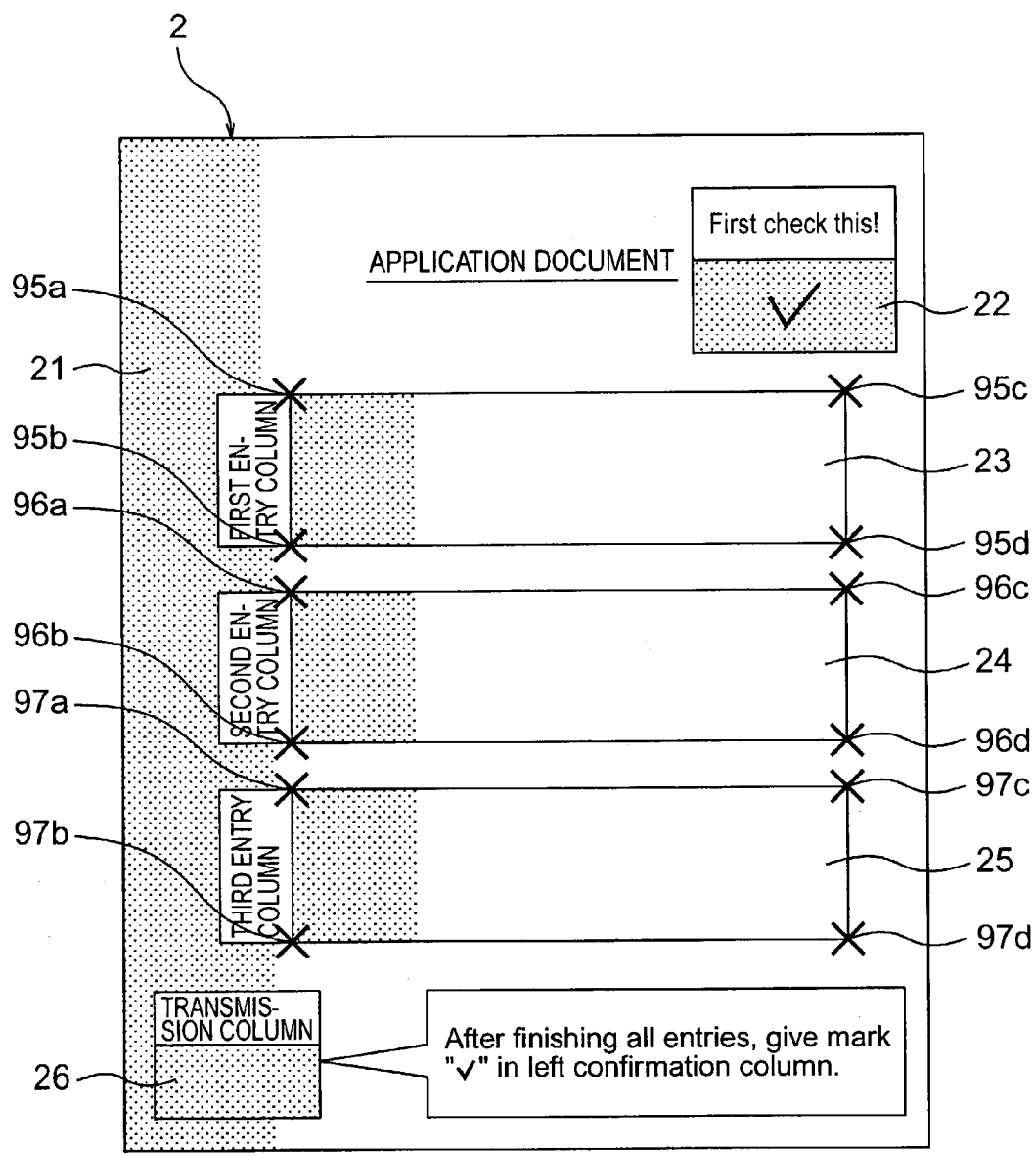
FIG. 9 shows a structure of a document.

Explanation will now be made as to operations after data is entered until such a history information file 46 as shown in FIG. 4 is created, in connection with the application document 2 of FIG. 9 as an example.

As a preparation stage, first, a application document 2 and electronic pens 3 (three in this example) to be used to fill in the application document 2 are prepared, and the aforementioned file creation application program is activated.

Under this condition, a check mark is given in the document ID box 22 using any of the electronic pens. Positional information relating to the document ID box 22 is created by the electronic pen 3 and transmitted to the analyzer 4. Since the document ID can be specified on the basis of the positional information, the file creation application program creates a new first layer 51 or attaches new data to the existing first layer 51. When a first layer 51 is newly created, '1' is stored in the document number 52, and the address of a location where the document ID is to be stored in the later processing is stored in the document 1 pointer 53*a* as a pointer. When the existing first layer 51 is used, on the other hand, the document number 52 is incremented by one to create a new document pointer 52. Since the operation after the above operation is the same for the above two cases, explanation will be made in connection with the operation of creating the new history information file 46.

After setting the document number 52, the file creation application program stores the value of the acquired document ID in the address at which the document 1 pointer 53*a* as stored, which is used as the document ID 54 of the second layer 54.

Next, the filling person gives check marks to the four corners of the entry area of the first entry column 23 using the first electronic pen 3 for the first entry. At this time, positional information at the check points 95*a*, 95*b*, 95*c* and 95*d* are created by the electronic pen 3. When another location to be filled by the electronic pen 3 is present, check marks are given even to the other entry column 24 or 25. After check marks are given to all the entry areas, a check mark is given to the transmission column 26. The positional information so far created by the electronic pen 3 and accumulated are passed to the analyzer 4.

The file creation application program of the analyzer 4 stores '1' in the address subsequent to the document ID 55 of the second layer 54 as a value corresponding to the number of the electronic pens 3 as the entry pen number 56. Further, the program stores the value of the pen ID of the electronic pen 3 acquirable together with the positional information in the subsequent address as the pen ID 57*a*, and creates a pen ID entry column pointer to be later stored with use of the start address of the third layer 60 as a pointer.

Stored in the start addresses of the third layer 60 specified in the above operation for each the entry columns 23 to 25 are positional information about the check points 95*a*, 95*b*, 95*c*, 95*d*, etc., forming the entry column range 61*a*. For an area subsequent to the entry column range 61*a*, an area for the finished-entry flag 62*a* is secured.

The registering operation of the application document 2 by the first electronic pen 3, that is, the creating operation of the history information file 46 has now been completed. The similar operation will be done using the second electronic pen 3.

The filling person gives a check mark to the document ID box 22 using the second electronic pen 3 and then gives check marks to the four corners of the entry area of the entry column 24. At this time, positional information about check points 96*a*, 96*b*, 96*c* and 96*d* are passed from the electronic pen 3 to the analyzer 4.

The file creation application program of the analyzer 4 increments the value of the entry pen number 56 of the second layer 54 by one, and stores the pen ID value of the second electronic pen 3 at the address subsequent to the pen ID entry column pointer 58*a* of the first electronic pen 3 previously created as the pen ID 57*b*. At the same time, the file creation application program acquires the address subsequent to the finished-entry flag 62*a* of the first electronic pen 3 previously created and stores the acquired address in the pen ID entry column pointer 58*b*. Further, the program stores the positional information of the entry area such as the check points 96*a* to 96*d* in the stored address and secures a storage area for the finished-entry flag 62*b* similarly to the above.

Finally, the user gives check marks to the document ID box 22, the four corners of the entry area of the third entry column 25 and the transmission column 26, using the third electronic pen 3 for the third entry. Through the same operations as the above, the file creation application program stores the pen ID and positional information about check points 97*a* to 97*d* at predetermined positions. At this time, the value to be stored in the entry pen number 56 is incremented by one.

After all the data input operations are completed, the user instructs the file creation application program of the end of creation of the history information file 46 according to a guidance by a view prepared by the file creation application program. At this time, the file creation application program sequentially acquires the addresses of the finished-entry flag 62 created in the third layer 60 and sequentially stores the addresses in the entry column pointers of the entry sequence area 59 of the second layer 54.

Since the system can register the electronic pens 3, set and register the entry columns 22 to 25, and set various entry sequences in this manner, the system can easily create the history information file 46. Accordingly, the utilization of the document filling system 1 can be promoted. In particular, when the number of used electronic pens 3 is large or when the number of entry columns 22 to 25 in the application document 2 is large, the system can advantageously easily create the history information file 46 even when the entry sequence is based on complicated rules.

In this connection, it is not always required to store data forming the respective layers 51, 54 and 60 of the history information file 46 at contiguous addresses in the memory. Further, even when the system creates the history information file 46 using the application document 2, it is desirable that the file creation application program create such a view as shown in FIG. 8 or a view showing the structure of the history information file 46 in a model form, and after the user confirmed it, he/she terminate the creating operation of the history information file 46.

FOURTH EMBODIMENT

Detailed explanation will be made as to a fourth embodiment of the present invention, by referring to the accompanying drawings. In this connections, constituent elements having the same functions as those in the first, second and third embodiments are denoted by the same reference numerals or symbols, and explanation thereof is omitted.

The present embodiment is directed to the operation of the system when a single electronic pen 3 is used by a plurality of persons. The history information file 46 possessed by the analyzer 4 shown in FIG. 3 is featured by including an electronic pen information file 48 for linking the users to the electronic pens 3 and a document information file 49 for defining user or users for each document and the entry authority thereof.

Figure 10:
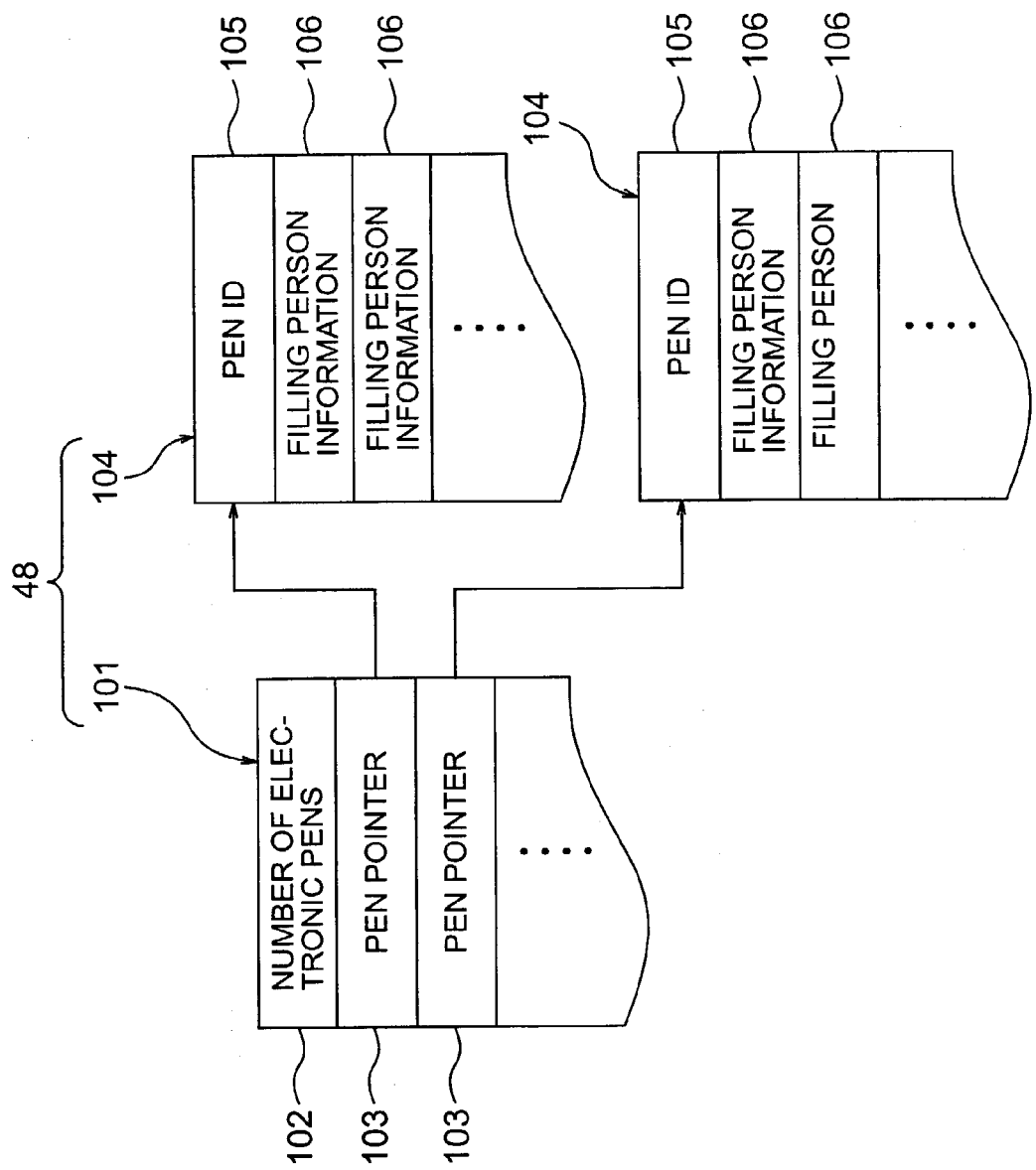
FIG. 10 shows a structure of an electronic pen information file.

The electronic pen information file 48 has such a layered structure as shown, e.g., in FIG. 10. The first layer 101 has an electronic pen number 102 for defining the number of electronic pens 3 to be used for entry of a specific document and pen pointers 103 for storing therein an address indicative of the leading position of a group of pieces of data for detailed definition of the respective electronic pens 3. The pen pointer 103 is created by a number corresponding to the number of the electronic pens 3 defined by the electronic pen number 102. A second layer 104 starts from an address stored in the pen pointer 103, and further has filling person information 106 for registering information about a specific filling person such as the name of a person who uses the electronic pen 3 having the pen ID. When the electronic pen 3 is used by a plurality of persons, a plurality of pieces of the filling person information 106 are arranged.

Figure 11:
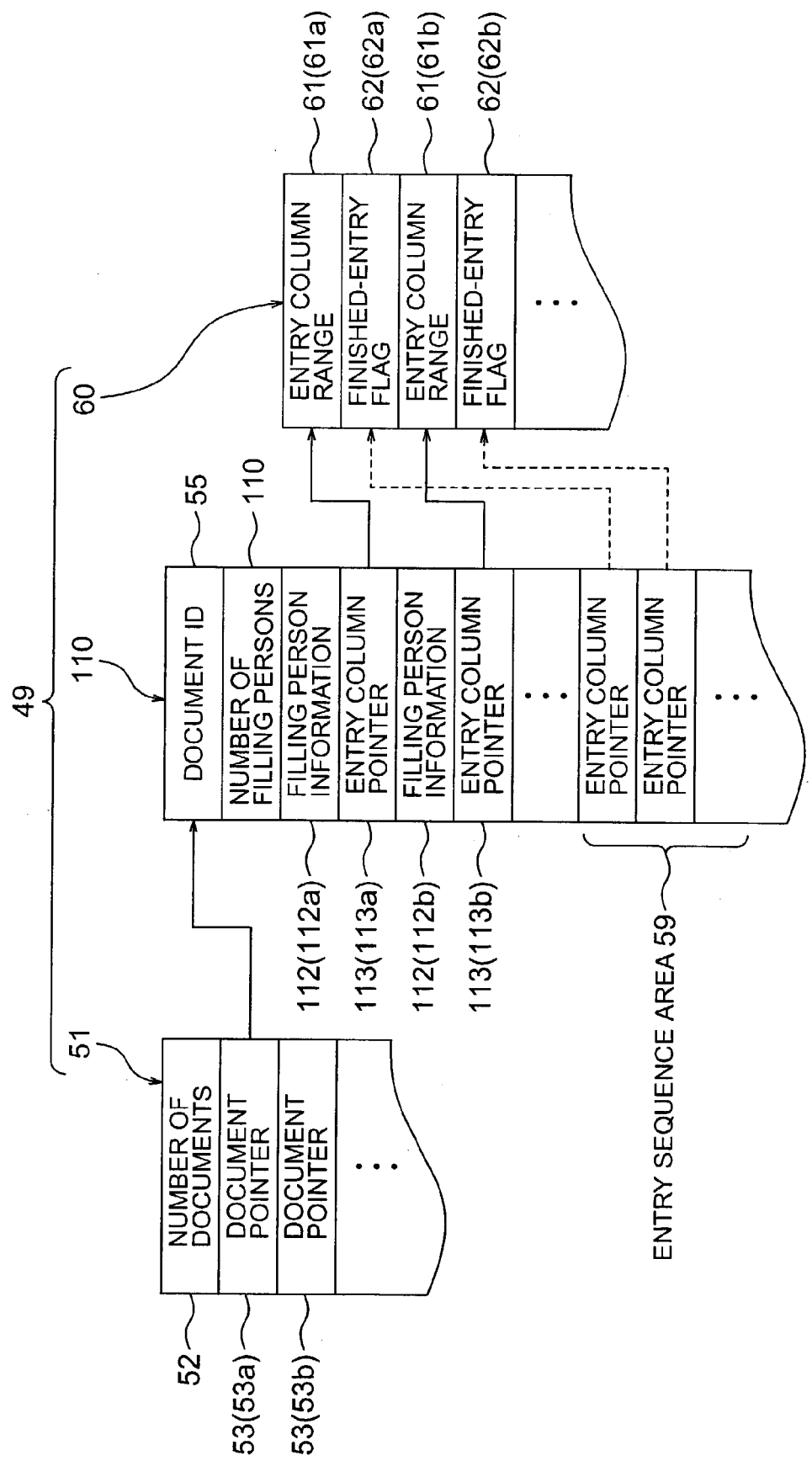
FIG. 11 shows a structure of a document information file.

The document information file 49 has a second layer 110 different from the history information file 46 of FIG. 4, and has such a layered structure as shown in, e.g., FIG. 11. More specifically, the second layer 110 has a document ID 55 started with an address stored in the document pointer 53 of the first layer 51 and a filling person number 111 for defining the number of filling persons in such an application document 2 as shown in FIG. 2. The filling person information 112 and an entry column pointer 113 are arranged respectively by a number corresponding to a value stored in the filling person number 111. Information for specifying the filling person is stored in the filling person information 112, and an address of the entry column range 61 of the third layer 60 is stored in the entry column pointer 113 as a pointer.

The operation of the document filling system including such an electronic pen information file 48 will be explained by referring mainly to FIG. 5. In this connection, explanation about the operations similar to in the first embodiment is omitted, and explanation will be focused on the featured operation of the present embodiment.

First, the system creates positional information about the document ID box 22 in the step S1 and specifies the document in the step S2, after which the system judges the entry authority in the step S3. The word 'entry authority' as used therein means the operation through which the judging means 62 judges whether or not the filling person has an entry authority over the document. More specifically, the system searches the electronic pen information file 48 of FIG. 10 for the pen ID 105 of the second layer 104 from the pen ID value acquired from the electronic pen 3, and acquires the filling person information 106 stored as associated with the pen ID 105. Further, the system searches for the document information file 49 from the pen ID value and the document ID value, and acquires the filling person information 112 of the second layer 110. And the system compares the filling person information 106 with the filling person information 112, and when finding a coincidence therebetween, the system judges that the filling person is 'authorized'. When failing to find a coincidence therebetween, on the other hand, the system judges that the filling person is 'not authorized' and proceeds to Steps S4 and S5 to inform the person of no entry authority.

When the filling person has the entry authority and the entry sequence is correct (Step S6), the analyzer 4 stores in Step S8 the positional information created in Step S7 and goes to Step S9 to judge the entry position. In Step S9, when the filling person is specified in a filling person information 111a of the second layer 110 of the document information file 49, the judging means 62 refers to the entry column range 61a of an address acquired in the filling person information 112a and judges whether or not the entry position is correct. And after the judging means judges the entry sequence of the filling person in Step S10, control goes to Step S11 where the filling person first sets the finished-entry flag 62a. Finally, the system passes the positional information to the switching means 5, thus terminating its operation.

In the presence of a second filling person, similar operations are repeated for the application document 2 already filled by the first filling person. In this case, the judging operation (Step S3) of the entry authority is carried out with use of the filling person information 106 of the electronic pen information file 48 acquired based on the pen ID value of the electronic pen 3 for use of the second filling person and the filling person information 112b and entry column pointer 113b of the document information file 49. The judging operation (Step S10) of the entry sequence is carried out by referring to the finished-entry flag 62a of the first filling person. The setting operation (Step S11) of the finished-entry flag is carried out by storing a value in the finished-entry flag 62b of the document information file 49. Further, even when the third and subsequent filling persons are present, similar operations to the above are repeated.

When a plurality of filling persons create a single application document 2 using the electronic pens 3, such a document filling system 1 can judge the locations in which the respective filling persons are to fill or the entry sequence of the respective filling persons. Therefore, a document filling error can be reduced. And if the filling location or entry sequence is wrong or if the filling person is not authorized, then the system can inform the filling person of the wrong location or entry sequence through the electronic pen 3, whereby the filling person can quickly find the filling error.

Even in the case of creating the electronic pen information file 48 and document information file 49, the system can easily create the files using the definition view (see FIG. 8) and the definition paper (see FIG. 9) as in the third embodiment. In order to link the filling person to the pen ID in the electronic pen information file 48, it is required to provide an filling person information column and to fill in such a column with the filling person information using the electronic pen 3 for linkage.

The present invention is not restricted to the above specific embodiments and can be applied widely.

For example, the document ID box 22 and the transmission column 26 may be combined if necessary into a single column in each of the application documents 2 and 71. In particular, in the case of the application document 71, the document can be specified while eliminating the need for again giving a check mark to the document ID box 22 after the electronic pen confirmation column 72 is checked.

The notification means 37 of the electronic pen 3 is designed to include a liquid crystal display unit, whereby the presence or absence of an entry authority or wrong or correct entry sequence can be separately informed by a character display presentation. Since a detailed error reason can be visually informed to the filling person, the filling person can quickly take a necessary measure for it. As another form of the notification means 37, a means for informing the user by changing the appearance shape of the electronic pen 3, e.g., by projecting a notch built in the electronic pen 3 may be employed. Or the system may be arranged so that the electronic pen 3 has no notification means 37 and an error is transmitted to a portable information terminal or a computer apparatus to inform the user of the error in the form of sound or character, thus enabling realization of effects similar to the foregoing embodiments.

Further, Step S9 (judging operation of the entry position) and Step S10 (judging operation of the entry sequence) in FIG. 5 may be executed in a different order.

Furthermore, when the system utilizes the filling person information (refer to FIG. 10), the system may specify the filling person information by known sign collation or the like at the time of starting using a pen, store the information in the filling person information 106, and use it for judgment of presence or absence of an entry authority or entry sequence.

As has been explained in the foregoing, in accordance with the present invention, even when a document is created manually using a plurality of electronic pens, the system can process the document in the form of electronic data and thus increase a processing speed and improve a processing accuracy.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A document filling system comprising:
    an analyzer for acquiring information manually filled by a filling person in an entry column of a document using an electronic pen as positional information indicative of a locus of a tip of the electronic pen created based on a dot pattern formed on a paper sheet, and for processing the filled information as electronic data, said document having a paper sheet and the dot pattern formed thereon and having entry columns on the paper sheet, said analyzer comprising:
    communication means for performing data transfer to or from said electronic pen,
    a history information file for defining the electronic pen having an entry authority over the document and an entry sequence of the entry columns thereon based on a document ID of said document, the document ID being used for identification of one of a plurality of documents,
    means for judging whether or not said electronic pen has an entry authority over said document, based on a pen ID received from said electronic pen and a pen ID assigned for said document, referring to an area of the entry sequence in said history information file, and judging whether or not a current entry sequence is correct by checking, in a sequential order, finished-entry flags indicated by an entry column pointer stored in the area of the entry sequence in said history information file, and
    means for creating information to inform said electronic pen of a judged result by said judging means,
    wherein said electronic pen includes notification means for receiving the judged result thus informed from said analyzer, and informing said filling person of the judged result thus received.

2. The document filling system as set forth in claim 1, wherein an entry column capable of filling by said electronic pen and the entry sequence thereof are defined for said each document ID and for said each electronic pen in said history information file, and said judging means acquires said positional information, refers to said history information file, and judges the fillable entry column and the filled entry sequence.

3. The document filling system as set forth in claim 1, wherein said history information file has a file structure in which said pen ID is linked to information for specifying said filling person to register a plurality of filling persons for said electronic pen.

4. The document filling system as set forth in claim 2, wherein said history information file has a file structure in which said pen ID is linked to information for specifying said filling person to register a plurality of filling persons for said electronic pen.

* * * * *